(12) United States Patent
Kikitsu et al.

(10) Patent No.: US 7,740,767 B2
(45) Date of Patent: Jun. 22, 2010

(54) METHOD AND APPARATUS FOR MANUFACTURING PATTERNED MEDIA

(75) Inventors: Akira Kikitsu, Yokohama (JP); Yoshiyuki Kamata, Tokyo (JP); Satoshi Shirotori, Fuchu (JP); Masatoshi Sakurai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1032 days.

(21) Appl. No.: 11/472,525

(22) Filed: Jun. 22, 2006

(65) Prior Publication Data

US 2006/0289382 A1 Dec. 28, 2006

(30) Foreign Application Priority Data

Jun. 24, 2005 (JP) ............................. 2005-185234

(51) Int. Cl.
- *B44C 1/22* (2006.01)
- *B05D 5/12* (2006.01)
- *B05D 1/32* (2006.01)
- *B05D 1/02* (2006.01)
- *H01L 21/306* (2006.01)

(52) U.S. Cl. .................. 216/22; 156/345.33; 427/127; 427/282; 427/421.1

(58) Field of Classification Search ............... None
See application file for complete search history.

(56) References Cited

U.S. PATENT DOCUMENTS

| | | | |
|---|---|---|---|
| 5,490,809 A * | 2/1996 | Jones et al. ................ 451/60 |
| 5,521,781 A * | 5/1996 | Kaneko et al. ............... 360/135 |
| 5,747,385 A | 5/1998 | Torii |
| 5,853,962 A | 12/1998 | Bowers |
| 5,915,915 A * | 6/1999 | Allen et al. ............... 414/744.1 |
| 6,123,020 A * | 9/2000 | Wolfer et al. ................ 101/35 |
| 6,147,960 A * | 11/2000 | Wolfer et al. ............. 369/30.52 |
| 6,782,544 B2 * | 8/2004 | Russ .......................... 720/619 |
| 6,932,895 B2 * | 8/2005 | Anderson et al. ............ 204/613 |
| 7,470,374 B2 * | 12/2008 | Hattori et al. ................ 216/22 |
| 2003/0079500 A1 * | 5/2003 | Umeyama ................... 65/30.1 |
| 2006/0023618 A1 * | 2/2006 | Tomiyama et al. ........ 369/275.1 |
| 2006/0289382 A1 * | 12/2006 | Kikitsu et al. ................. 216/22 |
| 2007/0145837 A1 * | 6/2007 | Herndon et al. ........... 310/67 R |
| 2008/0223402 A1 * | 9/2008 | Haneda et al. ................ 134/6 |
| 2009/0038743 A1 * | 2/2009 | Suzuki et al. ............... 156/154 |

FOREIGN PATENT DOCUMENTS

| | | |
|---|---|---|
| JP | 04-341946 | 11/1992 |
| JP | 05-314474 | 11/1993 |
| JP | 2004-079992 | 3/2004 |

* cited by examiner

*Primary Examiner*—Allan Olsen
(74) *Attorney, Agent, or Firm*—Pillsbury Winthrop Shaw Pittman, LLP

(57) ABSTRACT

According to one embodiment, a method for manufacturing a patterned media includes forming patterns of a magnetic layer having protrusions and recesses corresponding to tracks, servo zones or data zones on a substrate having a center hole, and spraying gas flow produced by diffusing a liquid gas toward the center hole of the substrate before or after forming the patterns of the magnetic layer.

17 Claims, 4 Drawing Sheets

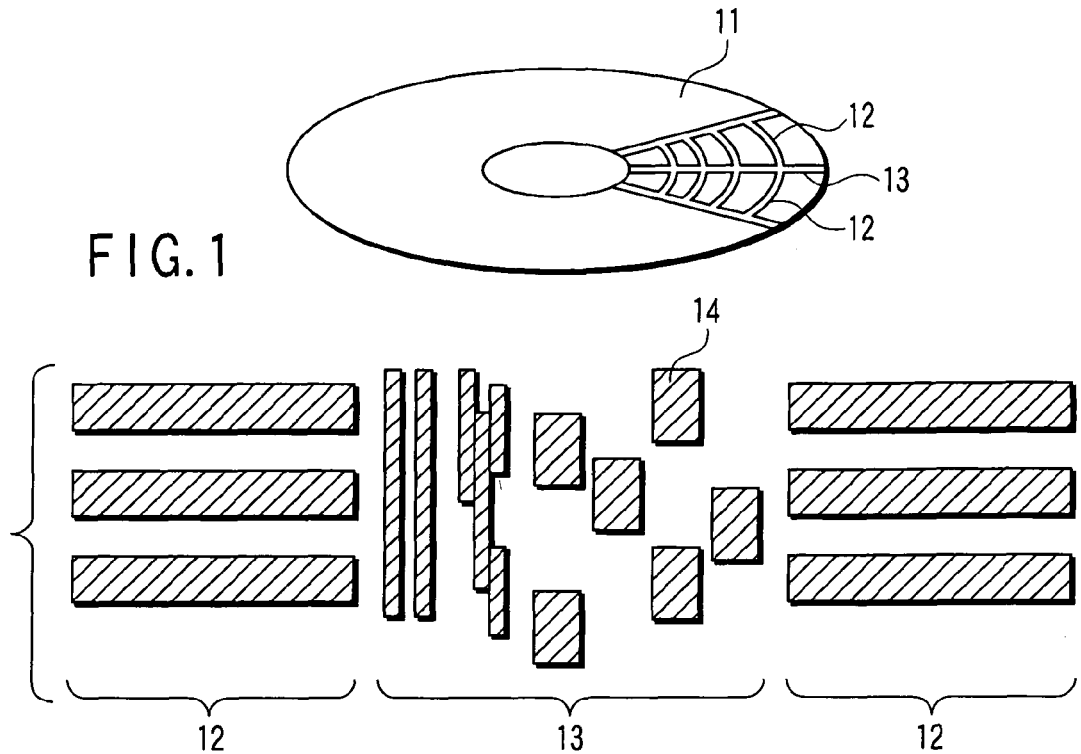
FIG. 1
FIG. 2
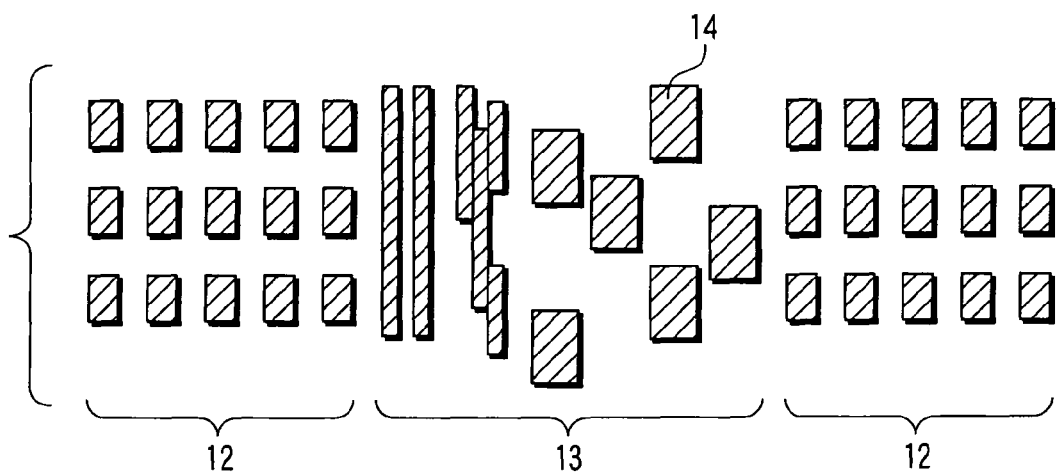
FIG. 3

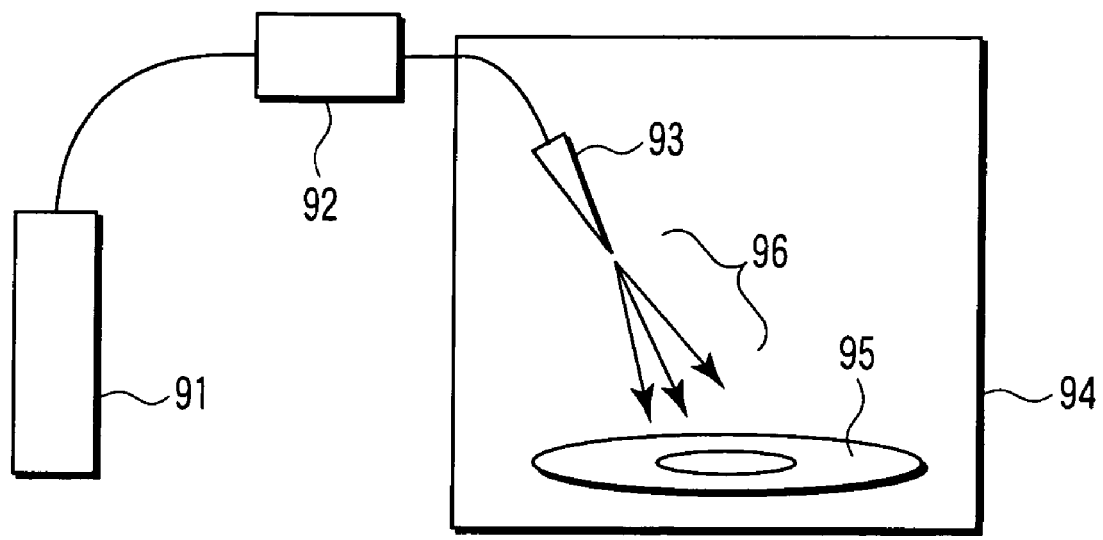
F I G. 9

METHOD AND APPARATUS FOR MANUFACTURING PATTERNED MEDIA

CROSS-REFERENCE TO RELATED APPLICATIONS

This application is based upon and claims the benefit of priority from Japanese Patent Application No. 2005-185234, filed Jun. 24, 2005, the entire contents of which are incorporated herein by reference.

BACKGROUND

1. Field

One embodiment of the present invention relates to a method and apparatus for manufacturing a patterned media, and more particularly to a method and apparatus for manufacturing a discrete track type patterned media having a center hole.

2. Description of the Related Art

A patterned media in which a magnetic layer is processed in patterns of servo signals and tracks or data bits has been studied as a high density magnetic recording media. Methods for manufacturing a patterned media are roughly classified into two types: a method in which a magnetic layer deposited on a substrate using a conventional method is etched by reactive ion etching (RIE), ion milling and the like; and a method in which a substrate is etched in advance and then a magnetic layer is deposited on the substrate using a conventional method. In any of these methods, dust or local mechanical degradation of a recording media becomes a problem because of the additional patterning process of the magnetic layer.

In particular, this problem is serious in the inner peripheral portion of a disk media. When a resist is spin-coated on the disk for patterning, the resist is likely to flow over the inner peripheral portion of the disk. In addition, the concentration of an electric field at the inner peripheral portion of the disk in RIE or ion milling process causes non-uniform or etching dust. Thus, the inner peripheral portion of a disk substrate is a location where the above problem is likely to occur. This location is hard to be cleaned. In spin-washing process, where a washing liquid is sprayed on the spinning substrate, sufficient cleaning effect is hardly obtained because a linear velocity is low at the inner peripheral portion. In addition, accumulated chemicals at the inner peripheral edge become a source for additional dust or defects of a media. In the case of a so-called dry process such as plasma irradiation, complete cleaning cannot be achieved because of non-uniformity in electric field as described above. In a semiconductor process, since typical substrate is a flat plate without a center hole, above mentioned problems at the inner peripheral portion do not occur in principle. Therefore, these problems are specific to a disk substrate. The semiconductor process has a long history, and a variety of techniques have been developed. However, such technical knowledge is not so helpful to the problems due to the center hole.

Jpn. Pat. Appln. KOKAI Publication No. 2004-79992 discloses a semiconductor manufacturing process in which contaminating particles are removed by a cryogenic cleaning process using $CO_2$ after chemical mechanical polishing (CMP) of a semiconductor material. In this method, liquid $CO_2$ is sprayed through a specially designed nozzle, for example, under a pressure of 850 psi (5.8 MPa) at 25° C. Since the liquid $CO_2$ is sprayed into an atmospheric pressure, it is rapidly expanded and cooled down. This results in the mixture of gas, liquid and solid $CO_2$. The flow of the gaseous and solid $CO_2$ is directed to the wafer surface using the nozzle. Cryogenic particles that reach the wafer surface at a high speed and collide with contaminating particles can overcome adhesion of the contaminating particles to the wafer surface through transfer of momentum, and can remove the contaminating particles directly. However, the technique disclosed in Jpn. Pat. Appln. KOKAI Publication No. 2004-79992 does not consider the above problems due to the center hole of a magnetic recording media.

U.S. Pat. No. 5,853,962 discloses a method and apparatus for removing photoresist and redeposited materials in a semiconductor process using liquid carbon dioxide snow. However, the apparatus disclosed in U.S. Pat. No. 5,853,962, which is generally called Eco-Snow, is used in the semiconductor manufacturing process, and use of the apparatus for the magnetic recording media is not considered in the patent. Therefore, the problems due to the center hole cannot be solved with the apparatus.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a schematic view showing a patterned media manufactured in accordance with a method of the present invention;

FIG. 2 is a plan view showing an example of a patterned media to be manufactured in accordance with a method of the present invention;

FIG. 3 is a plan view showing another example of a patterned media to be manufactured in accordance with a method of the present invention;

FIG. 9 is a schematic view showing a liquid gas spray apparatus according to an example of the present invention.

DETAILED DESCRIPTION

Figure 4:
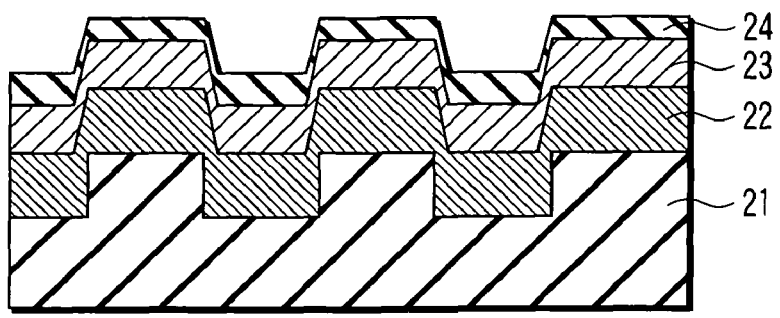
FIG. 4 is a sectional view showing a patterned media manufactured in accordance with a method of substrate etching type according to an example of the present invention.

Various embodiments according to the invention will be described hereinafter with reference to the accompanying drawings. In general, according to one embodiment of the present invention, there is provided a method for manufacturing a patterned media, comprising: forming patterns of a magnetic layer having protrusions and recesses corresponding to tracks, servo zones or data zones on a substrate having a center hole; and spraying gas flow produced by diffusing a liquid gas toward the center hole of the substrate before or after forming the patterns of the magnetic layer.

Preferred embodiments of the present invention will be described below.

FIG. 1 is a perspective view schematically showing a patterned media. On the surface of the magnetic recording media (patterned media) 11, there exists: a servo zone 13 used for tracking or data access control which includes burst signals, an address, a preamble and the like; and a data zone 12 where user data is written. These zones on the disk surface are schematically indicated by lines.

FIG. 2 is an enlarged plan view showing an example of a data zone and a servo zone on the patterned media shown in FIG. 1. In the servo zone 13 shown in FIG. 2, the patterns of magnetic layers formed on protrusions of the pre-patterned substrate correspond to the servo patterns of current magnetic recording media. The servo zone 13 includes burst signals 14 for making tracking control, for example. In the data zone 12 shown in FIG. 2, a magnetic layer is separated by recesses to form continuous tacks in a circumferential direction. This type of patterned media is also referred to as a discrete track media.

FIG. 3 is an enlarged plan view showing another example of a data zone and a servo zone in the patterned media shown in FIG. 1. In the data zone 12 shown in FIG. 3, a magnetic layer is separated by recesses to form data bits. This type of media is referred to as a patterned media in a narrow sense.

In the discrete track media shown in FIG. 2, the linear recording density is determined depending on a magnetization transition width formed on a track by means of a head in the same manner as that in the current media. In the patterned media in the narrow sense shown in FIG. 3, the linear recording density is determined by the fine patterning of data bits. In general, the media shown in FIG. 3 can achieve a higher recording density than that shown in FIG. 2. However, the media shown in FIG. 3 has disadvantages of fabrication process with smaller feature size and complex head access control. The present invention can be applied to either of the types shown in FIGS. 2 and 3.

Although FIG. 2 illustrates ABCD burst signals by way of example, the present invention can be applied to phase difference servo or any other servo system without being limited to the ABCD bursts. The present invention has effect of noise reduction of servo signals based on protrusions and recesses of substrate, as described later. That is, the present invention can be applied to a media in which servo signals are provided by the pre-patterned substrate.

FIG. 4 shows a sectional view of a patterned media manufactured in accordance with a method of substrate etching type. The substrate 21 is subjected to processing to form patterns of protrusions and recesses corresponding to a servo zone and a data zone. A stack of an underlayer 22, a magnetic layer 23, and a protective layer 24 are formed on the substrate 21. A nonmagnetic material may be filled in the recesses so that the surface of the magnetic recording media to be flat.

Figure 5:
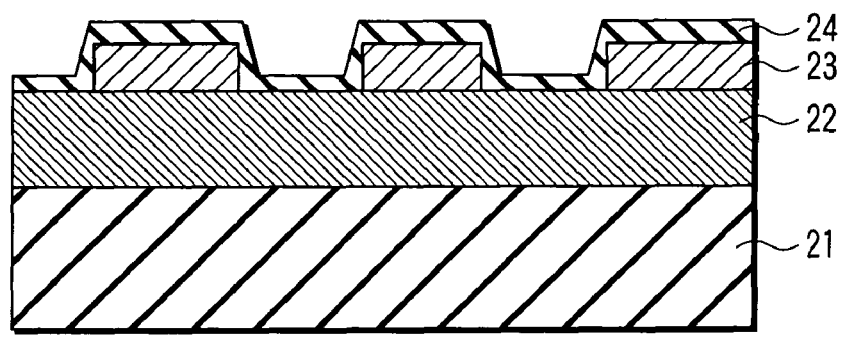
FIG. 5 is a sectional view showing a patterned media manufactured in accordance with a method of a magnetic layer etching type according to another example of the present invention.

FIG. 5 shows a patterned media manufactured by a method of magnetic layer etching type. The magnetic layer 23 is etched to have patterns for the servo zone and data track zone. In this case, the underlayer 22 and the substrate 21 may further be etched. The magnetic layer may remain in a recessed portion unless sufficient signal can be obtained from the pattern.

Figure 6:
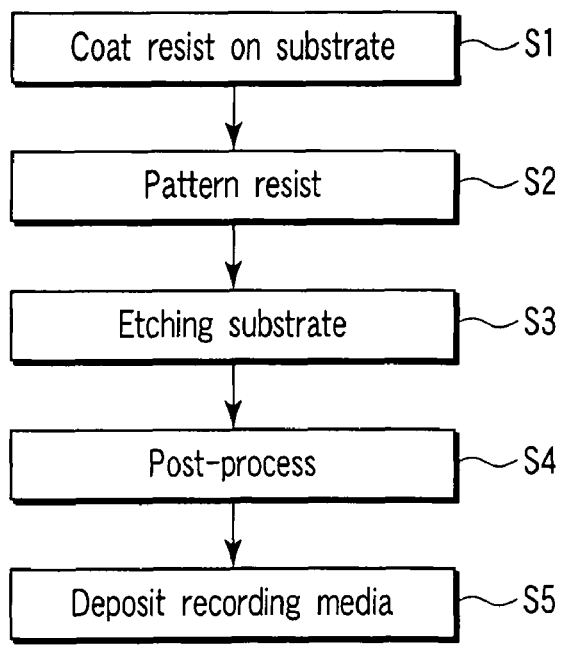
FIG. 6 is a flowchart showing exemplary processes for manufacturing a patterned media using a method of substrate etching type according to the present invention.

FIG. 6 is a flowchart showing exemplary processes for manufacturing a patterned media using a method of substrate etching type. First, a resist layer is coated on a substrate (S1). The material used for the resist has an etching rate lower than that of a film to be etched in the later etching step. A film having a low etching rate (referred to as a hard mask) may be deposited under the resist. The resist is formed into desired patterns (S2). Processing techniques include: an imprinting method in which a stamper having desired patterns is pressed to the resist to transfer the patterns; a method using an exposure system; and electron-beam direct writing. The patterning step also includes additional processing for removing remaining resist at bottoms of the recesses of the resist. The substrate is etched using the patterned resist as a mask (S3). Methods for etching the substrate can use chemical interaction of a gas such as RIE process or can use physical interaction of a gas such as ion milling process. Alternatively, so called wet etching may be used in which the substrate is immersed in an etching solution. A post-process is applied after the above steps (S4). Materials which do not constitute the patterned media such as resist must be removed in the post-process step. The post-process may include a step to remove burr, for example. A surface modification for subsequent process may be applied. In the step of depositing recording media (S5), an underlayer, a magnetic layer, and a protective layer are sequentially deposited. Then a lubricant is applied thereto. Each of these layers may be composed of a plurality of layers.

Figure 7:
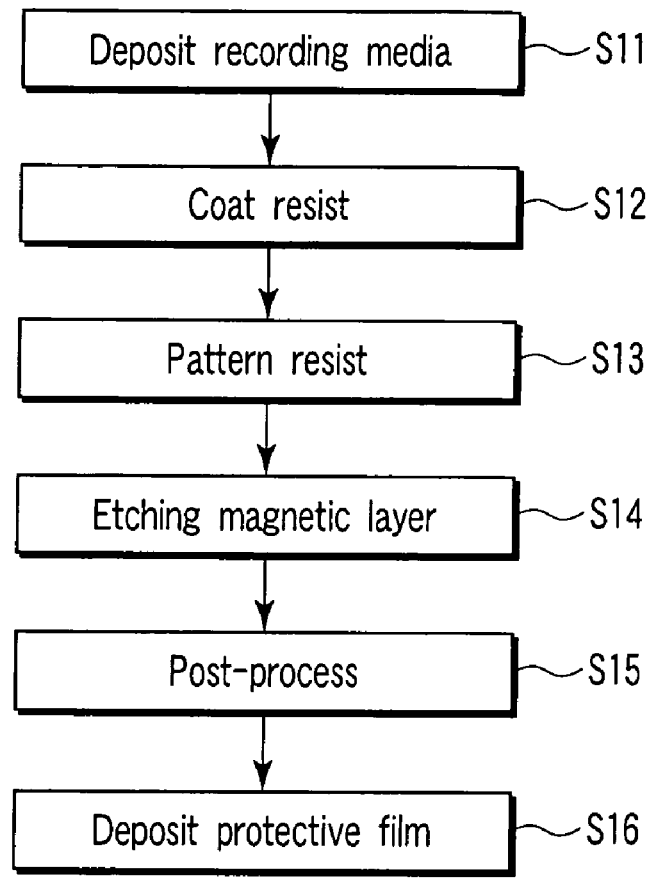
FIG. 7 is a flowchart showing exemplary processes for manufacturing a patterned media using a method of magnetic layer etching type according to the present invention.

FIG. 7 is a flowchart showing exemplary process for manufacturing a patterned media using a method of magnetic layer etching type. Each process of the method of magnetic layer etching type is similar to that in FIG. 6. In this method, first, recording media including a magnetic layer are deposited on a substrate (S11). Next, a resist layer is coated on the media (the magnetic layer or any other layer) instead of the substrate (S12). Resist patterning (S13) is carried out as in the case of FIG. 6. Etching the magnetic layer (S14) is also carried out similar to the step of etching the substrate (S3) in the method of substrate etching type. A post-process is applied after the above steps (S15). In this method, materials different from that used in the substrate etching type may be used for etching process. The etching object may be magnetic layer only or may be plural of layers including magnetic layer. In particular, in the case of the double-layer perpendicular media including a soft magnetic underlayer and a perpendicular recording layer, etching the soft magnetic underlayer may be preferable because magnetic interaction between patterns can be reduced. A step of depositing a protective layer (S16) can be further carried out if desired after the etching step. It is preferable that both of etched portion and un-etched portion be protected by the protective layer.

In the method for manufacturing a patterned media according to the present invention, a step of spraying gas flow produced by diffusing a liquid gas toward the center hole of the disk substrate is carried out at least once in the post-process step S4 or S15 in the above two methods.

However, if the Eco-Snow apparatus, which is used in a conventional semiconductor process, is used in the above step, there occurs a problem specific to the hard disk drive (HDD) media.

Figure 8:
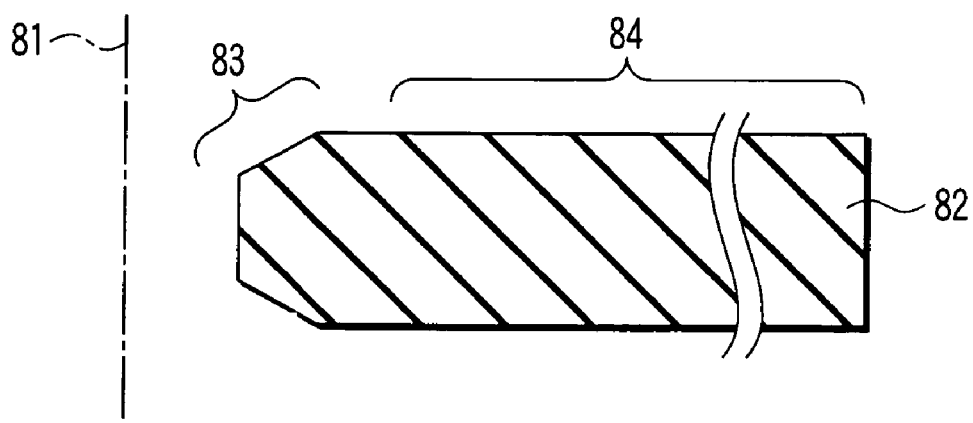
FIG. 8 is a sectional view showing an inner peripheral portion of a disk substrate used in a manufacturing method according to the present invention.

FIG. 8 shows the inner peripheral portion of a disk substrate in a magnetic recording media according to the present invention. In this figure, there are depicted the center line 81, the disk substrate 82, the tapered portion 83 in the inner peripheral portion, and the data zone 84, i.e., a zone where etching process is applied. The tapered portion 83 and the data zone 84 are clearly separated from each other. In general, a blank zone with a width of 1 mm or more which is neither the data zone nor the tapered portion is provided between the tapered portion 83 and the data zone 84. A zone around the tapered portion is used as a clamp zone for a disk substrate. The blank portion is provided for preventing the interference of a read-write head with the clamp.

If the process using the Eco-Snow apparatus is applied to the process for manufacturing a patterned media shown in FIG. 8, the region to be cleaned is the data zone 84, and the tapered portion 83 and inner peripheral edge will not be cleaned. In addition, a holder mechanism of the substrate (which is similar to the clamping mechanism in the HDD apparatus) is necessary for the Eco Snow process. If the jet gas flow by means of Eco-Snow apparatus is applied thereto, probability of spreading dust on the substrate and holder increases, which is not preferable for the HDD. Further, since contaminating substances generated in the course of processes for the HDD media have a much larger size than those of "contaminating substances" which can be removed by means of the Eco-Snow apparatus, such large contaminating substances cannot be removed by means of the Eco-Snow apparatus.

Under the circumstances, the present inventors have manufactured an apparatus schematically shown in FIG. 9. The apparatus shown in FIG. 9 is configured to spray gas flow produced by diffusing a liquid gas. In this figure, there are depicted the jet gas cylinder 91, the pressure regulator 92 capable of pressurizing or depressurizing the gas, the jet nozzle 93, the process chamber 94, the disk substrate 95 for a media, and jet gas flow 96. This apparatus is analogous to an Eco-Snow apparatus. However, this apparatus is different from the Eco-Snow apparatus in that: processing gas of water and a reactive gas such as $CF_4$, $CHF_3$, $SF_6$ and $C_2F_6$ can be used as well as $CO_2$; pressure effect at the tip end of the nozzle 93 can be controlled as desired by means of the pressure regulator 92; and a disk substrate 95 can be dealt with and the jet gas flow is controlled to be applied to the inner peripheral portion of the disk substrate. The gas supplied from the cylinder 91 is pressurized or depressurized by means of the pressure regulator 92 and is liquefied there. For the purpose of liquefying the gas, the pressure regulator 92 may be retained below the liquefying temperature of the gas employed. The liquid gas is sprayed in the process chamber 94 under a regulated pressure. At this time, the gas is made in a solid state or in a liquid state under a lower temperature than that in the pressure regulator 92 because of rapid depressurization, and is sprayed toward the disk substrate 95. In the known document, U.S. Pat. No. 5,853,962, there is described a method for removing the residual resist or the like by means of jet gas flow. On the other hand, in the present invention, the gas flow is sprayed toward the inner peripheral portion of the disk substrate, in particular toward the inner peripheral edge thereof. In order to improve an effect of spraying the liquid gas, the pressure in the process chamber 92 can be regulated in accordance with the type of the liquid gas.

The liquid gas is chosen for the residue to be removed which is present on the inner peripheral portion of the disk.

In the case where the residue is originated from a protective layer such as C or $SiO_2$, a liquid gas such as $CO_2$, $H_2O$, $O_2$, $SF_6$, $CF_4$, and $CHF_4$ may be used.

In the case where the residue is originated from a metal such as the magnetic layer, a liquid gas such as $BCl_3$, $CCl_4$, and $CBrF_3$ may be used.

Using a liquid gas spray apparatus according to the present invention shown in FIG. 9, experiments were carried out in which a variety of gases are sprayed toward inner peripheral portion of the disk including the edge and tapered portions under different conditions.

When the pressure in the process chamber was set at 2 to 5 atm (0.2 to 0.5 MPa) and the pressure of liquid $CO_2$ was regulated to 10 atm (1 MPa), sufficient effect of cleaning the inner peripheral portion of the disk was attained. It is not preferable to set the pressure in the chamber to 5 atm (0.5 MPa) or more in consideration of the safety of chamber operation.

In the case of using water vapor, when the pressure in the process chamber was reduce to 0.001 to 0.1 MPa and that of the water vapor was regulated to 5 atm (0.5 MPa), cleaning effect similar to that of carbon dioxide was observed.

Further, in the case where a reactive gas of $SF_6$ was used as a liquid gas to be sprayed, a sufficient cleaning effect was attained even when the pressure in the chamber was not regulated. When $SF_6$ was used, the spraying pressure was set at 10 atm (1 MPa). In particular, in the case where spin-on-glass (SOG) was used as a resist, excellent cleaning effect was attained.

When the liquid gas spray apparatus according to the present invention was used, a good cleaning effect for inner peripheral portion of the disk was attained, but it produced slight amount of dust and additional cleaning process was necessary. However, use of the liquid gas spray apparatus according to the present invention brings about an advantageous effect of improvement in head flying characteristics because of decrease in the number of abnormal protrusions on the inner peripheral portion of the patterned media, which surpasses the inconvenience of need for the additional cleaning process.

When thin films such as an underlayer and a magnetic layer are deposited on a substrate for a magnetic recording media with a sputtering apparatus, the substrate is generally held at the external peripheral portion thereof. Thus, these thin films are formed on the tapered portion and edge portion in the inner periphery. However, accuracy of surface patterning for these portions is poor compared with the case of the data zone. Further, the films deposited on the tapered portion have poor physical quality because sputtering particles incident obliquely to the tapered surface. Therefore, there has been a problem of flying instability of a read-write head over the inner peripheral portion due to abnormal protrusions. This problem is more serious in a patterned media. In addition to the aforementioned poor surface and film quality, processes such as resist coating or RIE accompanied by chemical substances which modify the surfaces of the edge portion and tapered portion in the inner periphery. This results in poor adhesion of the deposited layers. Since the head does not access the inner peripheral portion, degradation of film quality or abnormal protrusions in this portion does not directly affect flying characteristics. However, since plural of thin films which are subjected to internal stress are deposited on the tapered surface of the substrate with poor property, the films are likely to be cracked. When the films are cracked, broken pieces of the films reach the portion where the head can access. Further, in the case of the patterned media, similar crack may occur in the manufactuting process. This may degrade flying characteristics of over the regions where the head can access.

In the experiment described above, spraying of gas flow to the inner peripheral portion may change the property of the layer in the inner peripheral portion and improve adhesion of it. This reduces abnormal protrusions and further improves the flying characteristics. From the results of experiments performed with various types of gases, it is confirmed that an advantageous effect to suppress degradation of the flying characteristic over the inner peripheral portion can be attained regardless of types of gases, i.e., in any case of using $CO_2$, $H_2O$, and $O_2$ as well as fluorine containing reactive gas (such as $SF_6$, $CF_4$, and $CHF_3$), although some differences in effect are present. In addition, the advantageous effect is also attained with other reactive gas, for example, chlorine containing gases (such as $BCl_3$, $CCl_4$, and $CBrF_3$), which are used in RIE. It is expected that a similar advantageous effect may be attained with a carbonyl-based reactive gas.

Example 1

Patterned media having a cross sectional structure shown in FIG. 4 or 5 and a planar structure shown in FIG. 2 or 3 are fabricated using a method of manufacturing a patterned media according to embodiments of the present invention.

Two types of materials, i.e., (A) glass and (B) Al alloy subjected to surface hardening treatment with NiP are used as a substrate.

On the substrate, films selected from the following three types are deposited:

(a) CoZrNb soft magnetic underlayer 100 nm/CoB 5 nm/Ta 5 nm/Pd 5 nm/Ru 10 nm/CoCrPt—$SiO_2$ recording layer 15 nm/C protective layer 4 nm, where the soft magnetic underlayer includes antiferromagnetically coupled double-layered soft magnetic layers;

(b) FeTaN soft magnetic underlayer 80 nm/Ti 5 nm/Pd 10 nm/[Co 0.3 nm/Pd 0.9 nm]$_{20}$ recording layer/C protective layer 4 nm, where the recording layer is a so-called magnetic artificial lattice layer prepared by alternately laminating 0.3 nm-thick Co layers and 0.9 nm-thick Pd layers for 20 times; and (c) NiAl 60 nm/Cr 10 nm/CrMo 20 nm/CoCrPtTa recording layer 15 nm/C protective layer 4 nm.

The media of the types of (a) and (b) are so-called perpendicular magnetic recording media whose easy axis of magnetization is oriented perpendicular to the film surface; and the media of the type of (c) is a longitudinal magnetic recording media whose easy axis of magnetization is oriented in in-plane direction.

Two methods, i.e., (P1) a method of substrate etching type (FIG. 4) and (P2) a method of magnetic layer etching type (FIG. 5) are used for processing a patterned media. Patterns of discrete track type (FIG. 2) are formed on each of the magnetic recording media of the types (a) and (c); and patterns of a patterned media in a narrow sense (FIG. 3) are formed on the magnetic recording media of the type (b).

In order to improve flying characteristics, media in which the recessed portion between the patterns of the magnetic layer is filled with $SiO_2$ to flatten the surface thereof are also fabricated. The $SiO_2$ is deposited by bias sputtering, and the deposited $SiO_2$ film is etched-back by Ar ion milling to be flattened.

The patterns (such as servo signals, tracks, and addresses) formed on the media correspond to a track density of 110 kilotracks per inch (ktpi). In the case of a patterned media in a narrow sense, patterns correspond to a recording density of 1 megabit per inch (Mbpi) are formed in the data zones.

The aforementioned various media are tested for flying characteristics. Each media is set to a spin stand tester and is rotated at 4200 rpm and then a slider is loaded over the media, the slider has the nominal flying height of 12 nm. The slider is positioned over an inner region within ¼ of the radius. After one-hour flying operation, signals from an acoustic emission (AE) sensor mounted on the slider are measured. From results of flying characteristics of a conventional magnetic recording media, in order to provide flying characteristics of a product level, it has been found that no head crash occurs during one-hour flying operation as well as the signals of the AE sensor must be lower than 5V.

Table 1 shows a summary of samples provided for the tests and test results. In Table 1, the term "substrate" denotes a substrate type, and is either (A) glass or (B) Al alloy subjected to surface hardening treatment with NiP. The term "media" denotes any one of aforementioned types (a), (b) and (c). The term "process" denotes (P1) a method of substrate etching type (FIG. 4) or (P2) a method of magnetic layer etching type (FIG. 5). The term "filling" denotes the presence or absence of a process of filling $SiO_2$ to flatten the surface of the media. The term "diameter" denotes the diameter of a substrate. In the case of the present Example, two types of disk, i.e., a 2.5-inch disk and a 1.8-inch disk are used. The term "spray" denotes whether or not "the step of spraying gas flow produced by diffusing a liquid gas toward the center hole of the disk substrate" according to the present invention is carried out. $CO_2$ is used as the liquid gas. In the case of the method of magnetic layer etching type, this step is carried out after mask patterning (S13) or after magnetic layer etching (S14) in FIG. 7. In the case of the method of substrate etching type, this step is carried out after substrate etching (S3) in FIG. 6. In fabricating the samples of numbers 2, 4, and 7, a shield plate is placed above the center hole of the disk substrate so as to prevent from being subjected to the gas flow. The columns of "head crash" and "AE intensity" represent test results. In the former column, "X" denotes the case where a head crash occurs during one-hour continuous operation; and "○" denotes the case where no head crash occurs. The latter column represents a peak intensity of AE signals in a unit of volt (V).

TABLE 1

| Number | Substrate | Media | Process | Filling | Diameter | Spray | Head crash | AE intensity |
|---|---|---|---|---|---|---|---|---|
| 1 | A | a | P1 | ○ | 1.8 | X | ○ | 6.5 |
| 2 | A | a | P2 | ○ | 1.8 | X | ○ | 7.2 |
| 3 | A | b | P1 | ○ | 1.8 | X | ○ | 10.5 |
| 4 | A | b | P2 | ○ | 1.8 | X | ○ | 12.0 |
| 5 | A | a | P1 | X | 1.8 | X | X | — |
| 6 | B | c | P1 | X | 2.5 | X | X | — |
| 7 | B | c | P2 | ○ | 2.5 | X | X | — |
| 8 | A | a | P1 | ○ | 1.8 | ○ | ○ | 1.2 |
| 9 | A | a | P2 | ○ | 1.8 | ○ | ○ | 1.5 |
| 10 | A | b | P1 | ○ | 1.8 | ○ | ○ | 1.3 |
| 11 | A | b | P2 | ○ | 1.8 | ○ | ○ | 1.5 |
| 12 | A | a | P1 | X | 1.8 | ○ | ○ | 4.2 |
| 13 | B | c | P1 | X | 2.5 | ○ | ○ | 3.5 |
| 14 | B | c | P2 | ○ | 2.5 | ○ | ○ | 3.0 |

As shown in Table 1, one-hour flying operation is not successfully made in the case where no filling is carried out on an Al alloy substrate of substrate etching type. From AE intensity, all the samples to which the method of the present invention is not applied are rejected. In contrast, it is found that all the samples with gas flow jet process toward the center hole can achieve flying operation of acceptable level in the AE test. This result represents an advantageous effect of improving flying characteristics.

Further, with respect to the samples of numbers 5, 6, and 7 which can not attain successful flying operation for one hour, the process of gas flow jet toward the center hole of the disk substrate is applied using a liquid gas of $H_2O$, $O_2$, $SF_6$, $CF_4$, or $CHF_3$. These samples are subjected to tests of flying characteristics with a method similar to that described above. For these samples, only the peak intensity of AE signals within first 5 minutes after the head is loaded is measured. In any case, it is confirmed that the signal intensities are 5V or less, that is, the flying characteristics are improved regardless of gas type or substrate type and even in the case of using fluorine containing reactive gas.

After completed the evaluation of the flying characteristics, the microstructure of the edge surface of the center hole is observed with a scanning electron microscope (SEM). As a result, all the glass substrates are tapered as shown in FIG. 8 but the Al alloy substrates are not clear to be tapered as shown in FIG. 8. In addition, slight burr is observed in the sample of number 13. The reason why the tapering is hardly identified or the burr is observed in the Al alloy substrates is that the deformation of the inner edge portion takes place when a cylinder is passed through the center hole of the substrate in the alignment procedure in the imprinting process. However, even without tapering on the edge surface, the present invention is found to be effective for improving the flying characteristics. It is noted that the presence of tapering may be preferable because the flying characteristics tend to be improved.

Example 2

Patterned media similar to those in Example 1 are fabricated, and similar flying characteristic tests are carried out. The substrate is 0.85-inch type, and $CO_2$ is used as the liquid gas. The results are shown in Table 2. It is found that the samples which show good characteristics in Table 1 also exhibit good flying characteristics even when the size of the substrate is reduced.

TABLE 2

| Number | Substrate | Media | Process | Filling | Diameter | Spray | Head crash | AE intensity |
|---|---|---|---|---|---|---|---|---|
| 15 | A | a | P1 | ○ | 0.85 | ○ | ○ | 1.8 |
| 16 | A | a | P2 | ○ | 0.85 | ○ | ○ | 0.9 |
| 17 | A | b | P1 | ○ | 0.85 | ○ | ○ | 1.5 |
| 18 | A | b | P2 | ○ | 0.85 | ○ | ○ | 1.5 |

Then, similar tests are carried out for the samples in Table 2 but using chlorine containing reactive gas of $BCl_3$, $CCl_4$, or $CBrF_3$ as the liquid gas. It is found that the peak intensity of AE signals within the first 5 minutes after head loading is 5V or less, which represents an advantageous effect of improving the flying characteristics.

Hereinafter, a description will be given with respect to materials used for layers of a magnetic recording media according to the embodiments of the present invention.

<Substrate>

As a substrate, there can be used, for example, a glass substrate, an Al based alloy substrate, a ceramics substrate, a carbon substrate, a Si single-crystal substrate and the like. An amorphous glass or a crystallized glass can be used for the glass substrate. The amorphous glass includes a soda lime glass, alumino silicate glass and the like. The crystallized glass includes a lithium based crystallized glass or the like. As the ceramics substrate, there can be used: sintered materials that consist essentially of aluminum oxide, aluminum nitride, silicon nitride and the like or those with fiber-reinforced treatment. The Si single-crystal substrate, a so-called silicon wafer, may have an oxide layer on its surface. Above substrates may have NiP layer deposited by a plating method or a sputtering method.

<Underlayer>

An underlayer is used for purposes such as control of a crystallinity of a magnetic recording layer, control of particle size, and improvement of adhesion. Any kind of underlayer used for conventional magnetic recording media can be used. This layer may be composed of a plurality of layers in order to efficiently achieve the above purpose. The underlayer may be a metal, a dielectric, or a mixture thereof. A surface of a layer consists of the underlayer may be modified in accordance with ion irradiation, gas exposure and the like.

In addition, the underlayer may be a magnetic layer. In particular, in the case where the magnetic recording layer is a perpendicular magnetic layer, a so-called perpendicular double-layer media, where a perpendicular magnetic recording layer is stacked on a soft magnetic underlayer (SUL) having high permeability can be obtained. The soft magnetic underlayer of the perpendicular double-layer media is provided to pass a writing magnetic field from a writing magnetic pole, and then, return the recording magnetic field to a return yoke in the vicinity of the writing magnetic pole. That is, the soft magnetic underlayer serves as part of a function of a writing head, and serves to improve writing efficiency.

A high permeability material including at least one of Fe, Ni, and Co is used for the soft magneitc underlayer. Such materials can include: a FeCo based alloy such as FeCo or FeCoV; a FeNi based alloy such as FeNi, FeNiMo, FeNiCr, or FeNiSi; a FeAl based and FeSi based alloys such as FeAl, FeAlSi, FeAlSiCr, FeAlSiTiRu, or FeAlO; a FeTa based alloy such as FeTa, FeTaC, FeTaN; and a FeZr based alloy such as FeZrN.

Thin film having a fine crystalline structure such as FeAlO, FeMgO, FeTaN, and FeZrN containing 60 at % or more of Fe can be used for SUL. A granular film in which fine crystalline grains are dispersed in matrix can be used for SUL.

As other materials of the soft magnetic underlayer, there can be used a Co alloy containing Co and at least one of Zr, Hf, Nb, Ta, Ti, and Y. Co is preferably contained in 80 at % or more. In the case where such a Co alloy has been deposited by sputtering, an amorphous layer is easily formed. The amorphous soft magnetic material shows very excellent soft magnetic property because it does not have crystalline magnetic anisotropy, a crystalline defect or a grain boundary. In addition, noise reduction of media can be achieved by using the amorphous soft magnetic material. The preferable amorphous soft magnetic materials can include CoZr, CoZrNb, CoZrTa based alloy or the like, for example.

Under the soft magnetic underlayer, an underlayer may be further provided for the purpose of improvement of a crystallinity of the soft magnetic underlayer or improvement of adhesion to a substrate. As a material for the underlayer, there can be used Ti, Ta, W, Cr, Pt or an alloy containing these elements, or alternatively, oxide or nitride thereof.

An intermediate layer made of non-magnetic material may be provided between the soft magnetic underlayer and the perpendicular magnetic recording layer. The role of the intermediate layer is to interrupt exchange coupling interaction between the soft magnetic underlayer and the recording layer and to control crystallinity of the recording layer. As a material for the intermediate layer, there can be used Ru, Pt, Pd, W, Ti, Ta, Cr, Si, or an alloy containing these elements, or alternatively, oxide and nitride thereof.

In order to prevent spike noise, the soft magnetic underlayer may be comprised of a plurality of layers, and have a Ru layer having thickness of 0.5 to 1.5 nm interposed therebetween, whereby anti-ferromagnetic coupling is exerted. In addition, the soft magnetic layer may be exchange coupled with a hard magnetic layer having in-plane anisotropy such as CoCrPt, SmCo, or FePt or a pinning layer made of anti-ferromagnetic material such as IrMn or PtMn. In this case, in order to control an exchange coupling force, a magnetic layer, for example, Co, or alternatively, a non-magnetic layer, for example, Pt, may be laminated at the top and bottom of the Ru film.

<Magnetic Recording Layer>

The magnetic recording layer can be used as either a perpendicular magnetic layer in which an easy axis of magnetization is mainly oriented in a perpendicular direction or an in-plane magnetization film in which an easy axis of magnetization is oriented in an in-plane direction. It is preferable that the magnetic recording layer is made of an alloy consisting essentially of Co, for example, a CoPt alloy, because high anisotropy can be attained. The magnetic recording layer may contain oxide materials. As the oxide materials, a Co oxide, a silicon oxide, a titanium oxide can be used. Metal oxide, where the metal consists of a magnetic recording layer can be used.

The magnetic recording layer may be a so-called granular media in which magnetic grains (magnetic crystalline grains) are dispersed in a film. In particular, in the case of a discrete track media, the linear recording density is determined by a mechanism similar to that of a conventional media. Thus, it is preferable to use a granular media known to improve linear recording density in the conventional media. In the case of the patterned media shown in FIG. 3, the linear recording density is determined by processing accuracy, that is, a magnetic layer other than the granular film can be used.

The magnetic recording layer can include one or more elements selected from B, Ta, Mo, Cu, Nd, W, Nb, Sm, Tb, Ru, and Re as well as Co, Cr, Pr, and oxide of them. By using the above elements, reduction in the size of the magnetic grains can be promoted or a crystallinity and orientation of them can be improved. This leads to the improvement of write and read characteristics and thermal stability suitable to high density recording. A so-called magnetic artificial lattice film, where Co and noble metals such as Pt, and Pd are stacked for many times, may be used as a magnetic recording layer. An ordered alloy of magnetic elements (such as Fe or Co) and noble elements (such as Pt and Pd) can be used.

The magnetic recording layer may be a multi-layered structure. Higher density recording can be achieved by using a recording layer made of two or more magnetic layers having different magnetic characteristics each other. The recording layer may be made of a plurality of magnetic recording layers and a plurality of non-magnetic layers. For example, in the case of longitudinal media, when an Ru layer is inserted into a plurality of magnetic layers, the anti-ferromagnetic exchange coupling exerts between them and the linear recording density can be improved. This structure can be also used for the present invention.

The thickness of the magnetic recording layer is preferably 2 nm to 60 nm or more preferably 5 nm to 30 nm. In this range, a magnetic recording and reproducing apparatus suitable to high recording density can be operated. If the thickness of the magnetic recording layer is less than 2 nm, a read output becomes low and a noise becomes high. If the thickness of the magnetic recording layer exceeds 60 nm, a read output tends to be too high and waveform is distorted.

It is preferable that the coercivity of the magnetic recording layer is 237000 A/m (3000 Oe) or more. If the coercivity is less than 237000 A/m (3000 Oe), the thermal stability is degraded.

<Protective Layer>

A protective layer has a function of preventing corrosion of a magnetic recording media and also has a function of preventing damage of a media surface when a magnetic head comes into contact with a media. A material for the protective layer can include a material containing C, Si—N, Zr—O, and Si—N. It is preferable that the thickness of the protective layer is in the range of 0.5 to 10 nm. The thickness of the protective layer within the above range is suitable to high density recording, since a distance between a head and a media can be reduced.

<Lubricant Layer>

As a lubricant, for example, there can be used a perfluoro polyether, a fluoro alcohol, or a fluoro carboxylic acid and the like.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method for manufacturing a patterned media, comprising:
    forming a patterned magnetic layer or a magnetic layer having protrusions on a first substrate at a position corresponding to tracks, servo zones or data zones, the first substrate being provided with a center hole, and forming the patterned magnetic layer or the magnetic layer having the protrusions including:
        partially etching a second substrate having a first surface and provided with a center hole to obtain as the first substrate a substrate having protrusions on the first surface and then depositing a first magnetic layer on the first surface to obtain the magnetic layer having the protrusions, or
        providing a substrate having a second surface as the first substrate, depositing a second magnetic layer on the second surface, and partially etching the second magnetic layer to obtain the patterned magnetic layer; and
    applying a jet of a material in solid state or a jet of a liquefied gas material to an inner peripheral portion of the first substrate in a process chamber after partially etching the second substrate or after partially etching the second magnetic layer such that the jet of the material in solid state or the jet of the liquefied gas material removes residue from the first substrate or the second magnetic layer at a position of the inner peripheral portion of the first substrate, the jet of the material in solid state being produced by injecting a liquefied gas material into the process chamber to reduce a pressure of the liquefied gas material, and the residue to be removed being produced by partially etching the second substrate or by partially etching the second magnetic layer.

2. The method according to claim 1, wherein an edge of the first substrate at the center hole is tapered.

3. The method according to claim 1, wherein the liquefied gas material is $CO_2$, and is injected into the process chamber set at 2 to 5 atm.

4. The method according to claim 1, wherein the liquefied gas material is selected from the group consisting of $H_2O$, $O_2$, $SF_6$, $CF_4$, and $CHF_3$.

5. The method according to claim 1, wherein the liquefied gas material is selected from the group consisting of $BCl_3$, $CCl_4$, and $CBrF_3$.

6. The method according to claim 1, wherein the jet of the material in solid state is applied to the center hole of the first substrate.

7. The method according to claim 1, wherein the jet of the liquefied gas material is applied to the center hole of the first substrate.

8. The method according to claim 1, wherein the patterned magnetic layer or the magnetic layer having the protrusions is formed by partially etching the second substrate having the first surface and provided with the center hole to obtain as the first substrate the substrate having protrusions on the first surface and then depositing the first magnetic layer on the first surface;

wherein partially etching the second substrate includes:
coating a resist layer on the first surface;
patterning the resist layer; and
etching the second substrate using the patterned resist as a mask so as to obtain as the first substrate the substrate having protrusions on the first surface;

wherein the jet of the material in solid state or the jet of the liquefied gas material is applied to the center hole of the first substrate in the process chamber after partially etching the second substrate; and wherein the residue to be removed is produced by partially etching the second substrate.

9. The method according to claim 8, wherein an edge of the first substrate at the center hole is tapered.

10. The method according to claim 8, wherein the liquefied gas material is $CO_2$, and is injected, into the process chamber set at 2 to 5 atm.

11. The method according to claim 8, wherein the liquefied gas material is selected from the group consisting of $H_2O$, $O_2$, $SF_6$, $CF_4$, and $CHF_3$.

12. The method according to claim 8, wherein the liquefied gas material is selected from the group consisting of BCl3, CCl4, and CBrF3.

13. The method according to claim 1, wherein the patterned magnetic layer or the magnetic layer having the protrusions is formed by providing the substrate having the second surface as the first substrate, depositing the second magnetic layer on the second surface, and partially etching the second magnetic layer, wherein partially etching the second magnetic layer includes:
coating a resist layer on the second magnetic layer deposited on the second surface;
patterning the resist layer; and
etching the second magnetic film using the patterned resist as a mask;

wherein the jet of the material in solid state or the jet of a liquefied gas material is applied to the center hole of the first substrate in the process chamber after partially etching the second magnetic layer; and wherein the residue to be removed is produced by partially etching the second magnetic layer.

14. The method according to claim 13, wherein an edge of the first substrate at the center hole is tapered.

15. The method according to claim 13, wherein the liquefied gas material is $CO_2$, and is injected into the process chamber set at 2 to 5 atm.

16. The method according to claim 13, wherein the liquefied gas material is selected from the group consisting of $H_2O$, $O_2$, $SF_6$, $CF_4$, and $CHF_3$.

17. The method according to claim 13, wherein the liquefied gas material is selected from the group consisting of $BCl_3$, $CCl_4$, and $CBrF_3$.

* * * * *